(12) United States Patent
Kita et al.

(10) Patent No.: US 10,408,329 B2
(45) Date of Patent: Sep. 10, 2019

(54) CASING OF POWER TRANSMISSION DEVICE

(71) Applicant: Honda Motor Co.,Ltd., Tokyo (JP)

(72) Inventors: Hiroyuki Kita, Saitama (JP); Natsumi Iizuka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/921,665

(22) Filed: Mar. 15, 2018

(65) Prior Publication Data

US 2018/0266536 A1    Sep. 20, 2018

(30) Foreign Application Priority Data

Mar. 17, 2017    (JP) ................................. 2017-053397

(51) Int. Cl.
| | |
|---|---|
| *F16H 57/02* | (2012.01) |
| *F16H 57/029* | (2012.01) |
| *F16H 57/04* | (2010.01) |
| *F16H 3/66* | (2006.01) |
| *F16H 57/037* | (2012.01) |
| *F16H 57/00* | (2012.01) |

(52) U.S. Cl.
CPC ............. *F16H 57/029* (2013.01); *F16H 3/66* (2013.01); *F16H 57/037* (2013.01); *F16H 57/0404* (2013.01); *F16H 57/0423* (2013.01); *F16H 2057/0056* (2013.01); *F16H 2200/0069* (2013.01); *F16H 2200/2012* (2013.01); *F16H 2200/2048* (2013.01); *F16H 2200/2066* (2013.01); *F16H 2200/2082* (2013.01)

(58) Field of Classification Search
CPC ............... F16H 57/029; F16H 57/0404; F16H 57/0423; F16J 15/061
See application file for complete search history.

(56) References Cited

U.S. PATENT DOCUMENTS

| | | | | |
|---|---|---|---|---|
| 2,745,521 A | * | 5/1956 | White | ...................... F02F 11/00 269/47 |
| 4,221,039 A | * | 9/1980 | Smith | ....................... B25B 9/02 24/458 |
| 4,784,396 A | * | 11/1988 | Scott | ..................... F16B 41/002 277/598 |
| 5,937,817 A | * | 8/1999 | Schanz | .................. F01M 5/002 123/195 C |

(Continued)

FOREIGN PATENT DOCUMENTS

JP    2010-242829    10/2010

*Primary Examiner* — Thomas C Diaz
(74) *Attorney, Agent, or Firm* — JCIPRNET (57) ABSTRACT

Provided is a casing of a power transmission device which is capable of preventing a position of a gasket from being displaced without performing a complicated assembling process while suppressing an increase in a size of the entire power transmission device. A gasket (63) interposed between a TC side case member (61) and a TM side case member (62) has a first held portion (63*a*) which extends toward an inside of the TM side case member. A discharge mechanism (64) fixed to the TM side case member (62) has a first holding portion (64*a*1) which comes into contact with the first held portion (63*a*) from the TC side case member (61) side. The gasket (63) is held by the TM side case member (62) by sandwiching the first held portion (63*a*) between the TM side case member (62) and the first holding portion (64*a*1).

2 Claims, 7 Drawing Sheets

(56) References Cited

U.S. PATENT DOCUMENTS 6,231,050 B1 * 5/2001 Raden ................... F02F 11/00
                                                    123/195 C
7,241,246 B2 * 7/2007 Beutler ................. B03C 1/286
                                                    277/629

* cited by examiner

| | C1 | C2 | C3 | B1 | B2 | B3 | F1 | Gear shift ratio | Common ratio |
|---|---|---|---|---|---|---|---|---|---|
| Rvs | | | ○ | | ○ | | L | 4.008 | |
| 1st | | | | ○ | (○) | | R/L | 5.233 | |
| 2nd | | ○ | | ○ | ○ | | R | 3.367 | 1.554 |
| 3rd | | | ○ | ○ | ○ | | R | 2.298 | 1.465 |
| 4th | | ○ | ○ | ○ | | | R | 1.705 | 1.348 |
| 5th | ○ | | (○) | ○ | | | R | 1.363 | 1.251 |
| 6th | ○ | ○ | ○ | | | | R | 1.000 | 1.363 |
| 7th | ○ | | ○ | | ○ | | R | 0.786 | 1.273 |
| 8th | ○ | ○ | | | ○ | | R | 0.657 | 1.196 |
| 9th | ○ | | | | ○ | ○ | R | 0.584 | 1.126 |
| 10th | ○ | ○ | | | | ○ | R | 0.520 | 1.120 |

CASING OF POWER TRANSMISSION DEVICE

CROSS-REFERENCE TO RELATED APPLICATION

This application claims the priority benefit of Japan Application no. 2017-053397, filed on Mar. 17, 2017. The entirety of the above-mentioned patent application is hereby incorporated by reference herein and made a part of this specification.

BACKGROUND

Technical Field

The present disclosure relates to a casing of a power transmission device which accommodates built-in components therein.

Related Art

Conventionally, as a power transmission device mounted in a vehicle or the like, there is a power transmission device including a transmission which shifts a speed of a driving force of an internal combustion engine and then outputs the driving force, a differential device which distributes the driving force output from the transmission to left and right driving wheels, and a transfer device which distributes the driving force transmitted to the differential device to other driving wheels located in forward and backward directions.

In the power transmission device, built-in components forming each of the transmission, the differential device and the transfer device are accommodated in a casing. The casing is configured with a plurality of case members joined together through opening edges. A gasket is interposed at a joined portion between the case members to prevent lubricating oil therein from leaking (for example, refer to Japanese Patent Application Laid-Open (JP-A) No. 2010-242829).

However, in the conventional power transmission device as described in JP-A No. 2010-242829, when the case members are joined together (that is, when one of the case members relatively moves to the other), it is feared that the gasket may be displaced and it may take time and effort to assemble the casing. Therefore, it is conceivable to hold the gasket in advance on the case member to prevent a displacement of the gasket at the time of assembly and to easily assemble the gasket.

However, to hold the gasket on the case member, a working process for holding the gasket is required, and it is also necessary to provide a dedicated holding mechanism (for example, a hole for fastening a bolt) for holding the gasket. As a result, a complicated assembling process may occur to hold the gasket or a size of the entire power transmission device may be increased to provide the holding mechanism.

SUMMARY

The present disclosure provides a casing of a power transmission device which is capable of preventing a position of a gasket from being displaced without performing a complicated assembling process while suppressing an increase in a size of the entire power transmission device.

The present disclosure provides a casing (for example, a transmission case 31 in the embodiment, the same below) of a power transmission device (for example, a power transmission device PT in the embodiment, the same below) which is formed by joining a plurality of case members including a first case member (for example, a TM side case member 62 in the embodiment, the same below) and a second case member (for example, a TC side case member 61 in the embodiment, the same below) to each other through opening edges thereof and accommodates a built-in component (for example, a discharge mechanism 64, a strainer 65, a pump 66, and so on in the embodiment, the same below) therein, including a gasket (for example, a gasket 63 in the embodiment, the same below) interposed between the first case member and the second case member, wherein the built-in component is fixed to the first case member, a held portion (for example, a first held portion 63a, a second held portion 63b, a third held portion 63c, a fourth held portion 63d and a fifth held portion 63e in the embodiment, the same below) extends from the gasket toward the built-in component, a holding portion (for example, a first holding portion 64a1, a second holding portion 64b1, a third holding portion 64c1, a fourth holding portion 65b and a fifth holding portion 66a in the embodiment, the same below) which is in contact with the held portion from a side of the second case member is provided for the built-in component to extend toward the held portion, and the gasket is held by the first case member by sandwiching the held portion between the first case member and the holding portion.

As described above, in the casing of the power transmission device of the present disclosure, the gasket is held by the case member using a part (holding portion) of the built-in component originally fixed to the case member and a part (held portion) of the gasket. Therefore, the gasket is also held together when the built-in component is installed in the case member. Thus, it is possible to omit a process and a mechanism only for holding the gasket. Accordingly, according to the casing of the present disclosure, it is possible to hold the gasket without performing a complicated process while suppressing an increase in a size of the entire power transmission device.

DESCRIPTION OF THE EMBODIMENTS

Hereinafter, a vehicle in which a power transmission device having a casing according to an embodiment is mounted will be described with reference to the drawings.

Figure 1:
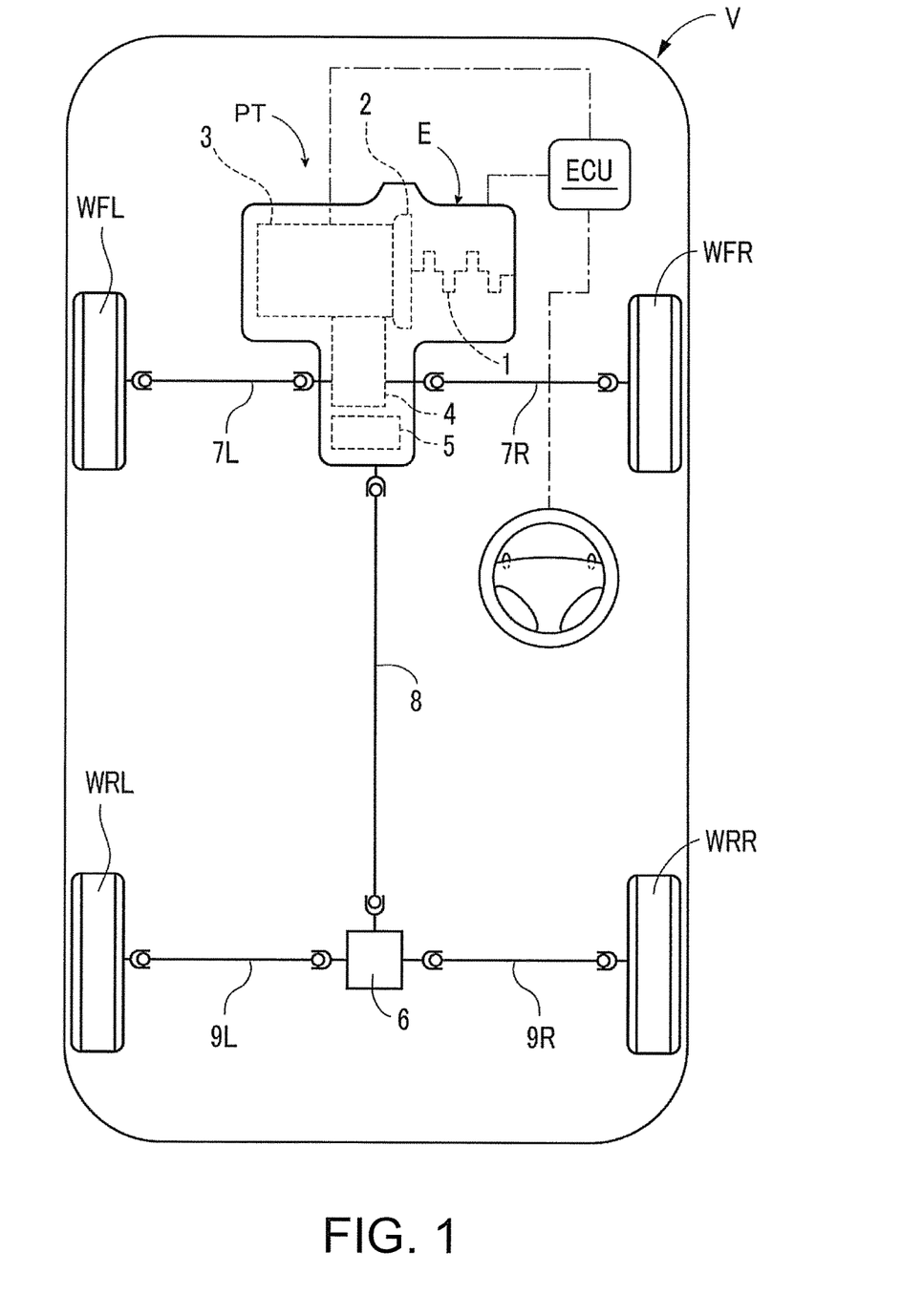
FIG. 1 is an explanatory view schematically illustrating a vehicle in which a power transmission device having a casing according to an embodiment is mounted.

As illustrated in FIG. 1, an engine E (internal combustion engine or driving source) is transversely mounted in a vehicle body so that a crankshaft 1 is directed in leftward/rightward direction of the vehicle body of a vehicle V. A driving force of the engine E is transmitted to a left front wheel WFL, a right front wheel WFR, a left rear wheel WRL and a right rear wheel WRR through a power transmission device PT.

The power transmission device PT includes a torque converter 2 connected to the crankshaft 1, a transmission 3 connected to the torque converter 2, a front differential gear 4 (differential device) connected to the transmission 3, a transfer device 5 connected to the front differential gear 4, and a rear differential gear 6 connected to the transfer device 5.

The front differential gear 4 is connected to the left front wheel WFL and the right front wheel WFR via a front left axle 7L and a front right axle 7R. The rear differential gear 6 is connected to the transfer device 5 via a propeller shaft 8 and is connected to the left rear wheel WRL and the right rear wheel WRR via the rear left axle 9L and the rear right axle 9R.

Figure 2:
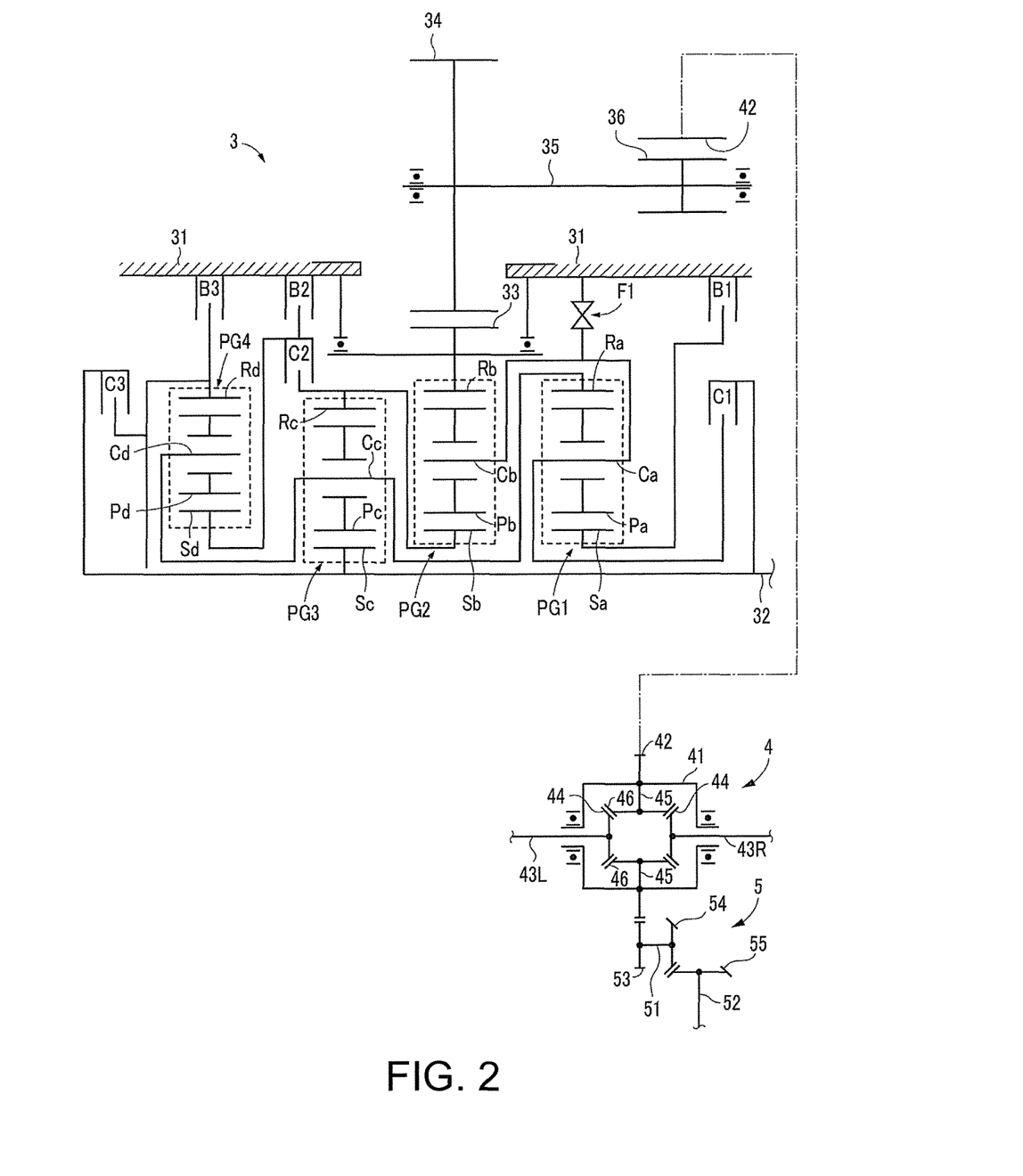
FIG. 2 is a skeleton diagram illustrating a transmission mounted in the vehicle of FIG. 1.

As illustrated in a skeleton diagram of FIG. 2, the transmission 3 includes an input shaft 32 pivotally supported inside a transmission case 31 (casing) to be rotatable, and an output member 33 configured with an output gear disposed concentrically with the input shaft 32.

The driving force output from the engine E is transmitted to the input shaft 32 via the torque converter 2 having a lock-up clutch and a damper.

Rotation of the output member 33 is transmitted to the left front wheel WFL and the right front wheel WFR (refer to FIG. 1) via an idle gear 34 engaged with the output member 33, an idle shaft 35 which pivotally supports the idle gear 34, a finale drive gear 36 pivotally supported by the idle shaft 35, and a final driven gear 42 (that is, the front differential gear 4) engaged with the final drive gear 36.

Further, in the power transmission device PT, a single plate type or multiple plate type starting clutch configured to be frictionally engageable may be provided in place of the torque converter 2. In this case, a TC side case member 61 may be replaced with a case which accommodates the starting clutch.

In an inside of the transmission case 31, a first planetary gear mechanism PG1, a second planetary gear mechanism PG2, a third planetary gear mechanism PG3, and a fourth planetary gear mechanism PG4 are disposed concentrically with the input shaft 32 in this order from the engine E side.

The third planetary gear mechanism PG3 is configured as a so-called single pinion type planetary gear mechanism having a sun gear Sc, a ring gear Rc, and a carrier Cc pivotally supporting a pinion Pc, which is engaged with the sun gear Sc and the ring gear Rc, rotatably and revolvingly.

In a so-called single pinion type planetary gear mechanism, when the carrier is fixed and the sun gear is rotated, the ring gear rotates in a direction different from that of the sun gear, and thus the so-called single pinion type planetary gear mechanism is also referred to as a minus planetary gear mechanism or a negative planetary gear mechanism. Also, in a so-called single pinion type planetary gear mechanism, when the ring gear is fixed and the sun gear is rotated, the carrier rotates in the same direction as that of the sun gear.

Figure 3:
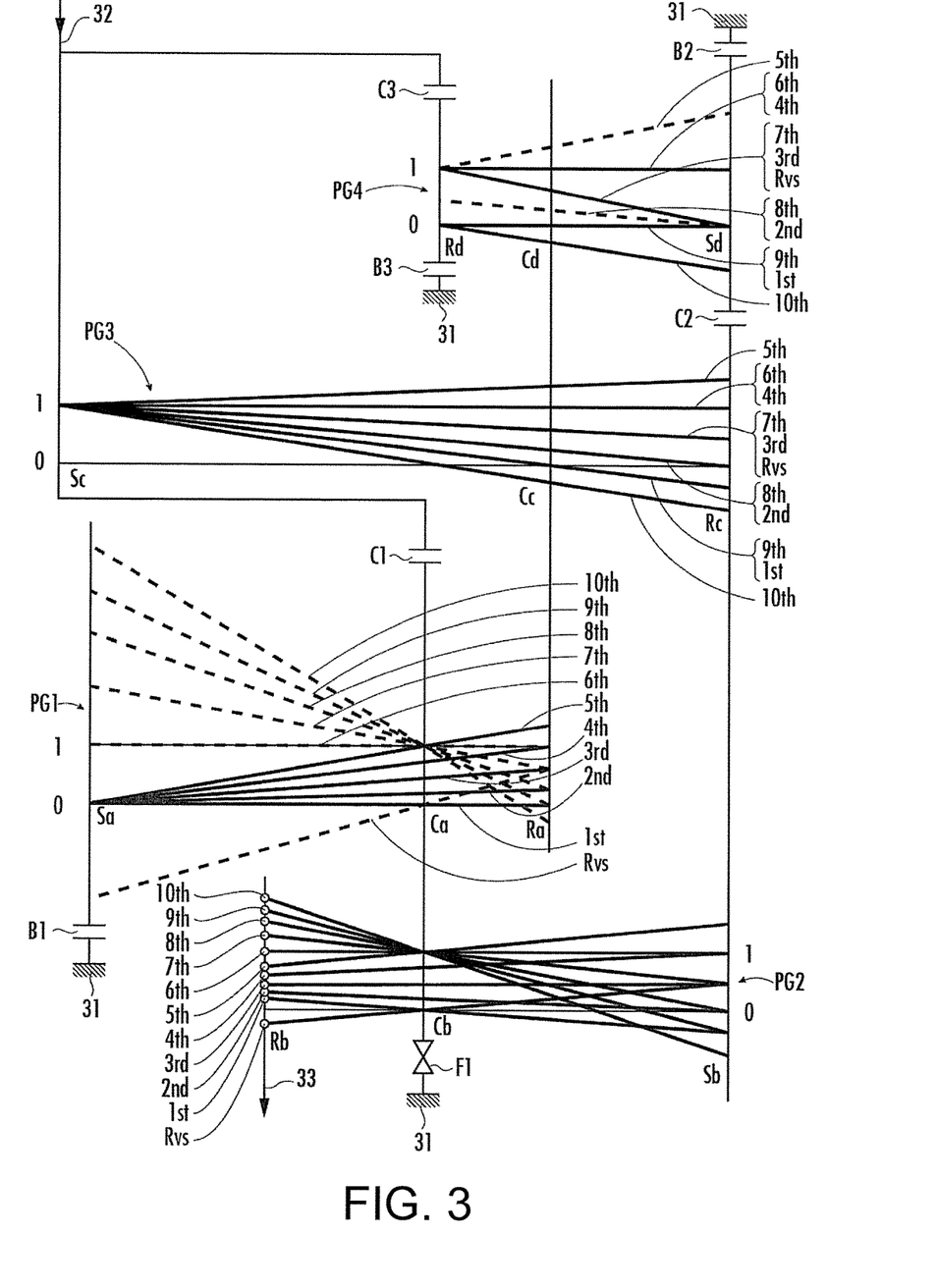
FIG. 3 is an alignment chart of a planetary gear mechanism of the transmission of FIG. 2.

An alignment chart (a diagram in which ratios between relative rotational speeds of three elements including the sun gear, the carrier and the ring gear can be expressed by a straight line (speed line)) illustrated in a second part from the top in FIG. 3 is an alignment chart of the third planetary gear mechanism PG3. As illustrated in the alignment chart, when it is assumed that the sun gear Sc, the carrier Cc and the ring gear Rc which are three elements of the third planetary gear mechanism PG3 are a first element, a second element and a third element from a left side in an arrangement order at intervals corresponding to a gear ratio (the number of teeth of the ring gear/the number of teeth of the sun gear) in the alignment chart, the first element is the sun gear Sc, the second element is the carrier Cc, and the third element is the ring gear Rc.

Here, a ratio between a distance from the sun gear Sc to the carrier Cc and a distance from the carrier Cc to the ring gear Rc is set to h:1, wherein h is the gear ratio of the third planetary gear mechanism PG3. Also, in the alignment chart, a lower horizontal line and an upper horizontal line (lines overlapping 4th and 6th) indicate that rotational speeds are "0" and "1" (the same rotational speed as that of the input shaft 32).

The fourth planetary gear mechanism PG4 is also configured as a so-called single pinion type planetary gear mechanism having a sun gear Sd, a ring gear Rd, and a carrier Cd pivotally supporting a pinion Pd, which is engaged with the sun gear Sd and the ring gear Rd, rotatably and revolvingly.

An alignment chart illustrated in a first part (uppermost part) from the top in FIG. 3 is an alignment chart of the fourth planetary gear mechanism PG4. As illustrated in the alignment chart, when it is assumed that the sun gear Sd, the carrier Cd and the ring gear Rd which are three elements of the fourth planetary gear mechanism PG4 are a fourth element, a fifth element and a sixth element from a left side in an arrangement order at intervals corresponding to a gear ratio in the alignment chart, the fourth element is the ring gear Rd, the fifth element is the carrier Cd, and the sixth element is the sun gear Sd.

Here, a ratio between a distance from the sun gear Sd to the carrier Cd and a distance from the carrier Cd to the ring gear Rd is set to i:1, wherein i is the gear ratio of the fourth planetary gear mechanism PG4.

The first planetary gear mechanism PG1 is also configured as a so-called single pinion type planetary gear mechanism having a sun gear Sa, a ring gear Ra, and a carrier Ca pivotally supporting a pinion Pa, which is engaged with the sun gear Sa and the ring gear Ra, rotatably and revolvingly.

An alignment chart illustrated in a third part from the top in FIG. 3 is an alignment chart of the first planetary gear mechanism PG1. As illustrated in the alignment chart, when it is assumed that the sun gear Sa, the carrier Ca and the ring gear Ra which are three elements of the first planetary gear mechanism PG1 are a seventh element, an eighth element and a ninth element from a left side in an arrangement order at intervals corresponding to a gear ratio in the alignment chart, the seventh element is the sun gear Sa, the eighth element is the carrier Ca, and the ninth element is the ring gear Ra.

Here, a ratio of a distance from the sun gear Sa to the carrier Ca and a distance from the carrier Ca to the ring gear Ra is set to j:1, wherein j is the gear ratio of the first planetary gear mechanism PG1.

The second planetary gear mechanism PG2 is also configured as a so-called single pinion type planetary gear mechanism having a sun gear Sb, a ring gear Rb, and a carrier Cb pivotally supporting a pinion Pb, which is engaged with the sun gear Sb and the ring gear Rb, rotatably and revolvingly.

An alignment chart illustrated in a fourth part (lowermost part) from the top in FIG. 3 is an alignment chart of the second planetary gear mechanism PG2. As illustrated in the alignment chart, when it is assumed that the sun gear Sb, the carrier Cb and the ring gear Rb which are three elements of the second planetary gear mechanism PG2 are a tenth element, an eleventh element and a twelfth element from a left side in an arrangement order at intervals corresponding to a gear ratio in the alignment chart, the tenth element is the ring gear Rb, the eleventh element is the carrier Cb, and the twelfth element is the sun gear Sb.

Here, a ratio of a distance from the sun gear Sb to the carrier Cb and a distance from the carrier Cb to the ring gear Rb is set to k:1, wherein k is the gear ratio of the second planetary gear mechanism PG2.

The sun gear Sc (first element) of the third planetary gear mechanism PG3 is connected to the input shaft 32. Further, the ring gear Rb (tenth element) of the second planetary gear mechanism PG2 is connected to the output member 33 configured as the output gear.

Also, the carrier Cc (second element) of the third planetary gear mechanism PG3, the carrier Cd (fifth element) of the fourth planetary gear mechanism PG4 and the ring gear Ra (ninth element) of the first planetary gear mechanism PG1 are connected to each other, and a first connected body Cc-Cd-Ra is formed.

Also, the ring gear Rc (third element) of the third planetary gear mechanism PG3 and the sun gear Sb (twelfth element) of the second planetary gear mechanism PG2 are connected to each other, and a second connected body Rc-Sb is formed.

Also, the carrier Ca (eighth element) of the first planetary gear mechanism PG1 and the carrier Cb (eleventh element) of the second planetary gear mechanism PG2 are connected to each other, and a third connected body Ca-Cb is formed.

Further, the transmission 3 has seven engagement mechanisms which includes three clutches which are a first clutch C1, a second clutch C2 and a third clutch C3, and three brakes which are a first brake B1, a second brake B2 and a third brake B3, and one two-way clutch F1.

The first clutch C1 is a hydraulically actuated wet multiple disk clutch. Due to the first clutch C1, the third planetary gear mechanism PG3 is configured to be switchable between a connected state in which the sun gear Sc (first element) and the third connected body Ca-Cb are connected and an open state in which the connection is disconnected.

The third clutch C3 is a hydraulically actuated wet multiple disk clutch. Due to the third clutch C3, the third planetary gear mechanism PG3 is configured to be switchable between a connected state in which the sun gear Sc (first element) and the ring gear Rd (fourth element) of the fourth planetary gear mechanism PG4 are connected and an open state in which the connection is disconnected.

The second clutch C2 is a hydraulically actuated wet multiple disk clutch. Due to the second clutch C2, the fourth planetary gear mechanism PG4 is configured to be switchable between a connected state in which the sun gear Sd (sixth element) and the second connected body Rc-Sb are connected and an open state in which the connection is disconnected.

The two-way clutch F1 also serves as a fourth brake B4. The two-way clutch F1 is configured to be switchable between a reverse rotation prevention state in which normal rotation (rotation in the same direction as a rotation direction of the input shaft 32 and the output member 33) of the third connected body Ca-Cb is allowed and reverse rotation is prevented and a fixed state in which the third connected body Ca-Cb is fixed to the transmission case 31.

In the reverse rotation prevention state, when a force intended to cause rotation in a normal rotation direction is applied to the third connected body Ca-Cb, rotation is allowed, and the two-way clutch F1 is brought into the open state. On the other hand, when a force intended to cause rotation in a reverse rotation direction is applied, rotation is blocked, and the two-way clutch F1 is brought into the fixed state in which the third connected body Ca-Cb is fixed to the transmission case 31.

The first brake B1 is a hydraulically actuated wet multiple disk brake. Due to the first brake B1, the first planetary gear mechanism PG1 is configured to be switchable between a fixed state in which the sun gear Sa (seventh element) is fixed to the transmission case 31 and an open state in which the fixed state is released.

The second brake B2 is a hydraulically actuated wet multiple disk brake. Due to the second brake B2, the fourth planetary gear mechanism PG4 is configured to be switchable between a fixed state in which the sun gear Sd (sixth element) is fixed to the transmission case 31 and an open state in which the fixed state is released.

The third brake B3 is a hydraulically actuated wet multiple disk brake. Due to the third brake B3, the fourth planetary gear mechanism PG4 is configured to be switchable between a fixed state in which the ring gear Rd (fourth element) is fixed to the transmission case 31 and an open state in which the fixed state is released.

The switching of the three clutches of the first clutch C1, the second clutch C2 and the third clutch C3, the three brakes of the first brake B1, the second brake B2 and the third brake B3, and one two-way clutch F1 is controlled by an electronic control unit (ECU) (refer to FIG. 1) including a transmission control unit (TCU) on the basis of vehicle information such as a traveling speed of a vehicle V transmitted from an integrated control unit which is not illustrated.

The electronic control unit (ECU) includes an electronic unit composed of a CPU, a memory or the like which is not illustrated. The electronic control unit (ECU) receives predetermined vehicle information such as a traveling speed of the vehicle V or an opening degree of an accelerator, a rotational speed or an output torque of the engine E, operation information of a paddle shift lever, and so on and controls the transmission 3 by executing a control program held in a storage device such as a memory by a CPU.

In the transmission 3, the first clutch C1, the first planetary gear mechanism PG1, the second planetary gear mechanism PG2, the third planetary gear mechanism PG3, the second clutch C2, the fourth planetary gear mechanism PG4 and the third clutch C3 are disposed on an axial line of the input shaft 32 in this order from the engine E and torque converter 2 side.

Additionally, the third brake B3 is disposed radially outward of the fourth planetary gear mechanism PG4, the second brake B2 is disposed radially outward of the second clutch C2, the first brake B1 is disposed radially outward of the first clutch C1, and the two-way clutch F1 is disposed radially outward of the first planetary gear mechanism PG1.

Accordingly, in the transmission 3, the first brake B1, the second brake B2, the third brake B3 and the two-way clutch F1 are disposed radially outside of the planetary gear mechanism or the clutch. Therefore, an axial length of the transmission 3 is shortened as compared with the case in which the first brake B1, the second brake B2, the third brake B3 and the two-way clutch F1 are disposed parallel to each other together with the planetary gear mechanism on the axial line of the input shaft 32.

Further, even if the third brake B3 is disposed radially outward of the third clutch C3 and the second brake B2 is disposed radially outward of the fourth planetary gear mechanism PG4, it is also possible to shorten the axial length.

Next, a case in which each gear shift stage of the transmission 3 of the embodiment is established will be described with reference to FIG. 3 and FIG. 4.

Further, a speed line indicated by a broken line in FIG. 3 indicates that elements of other planetary gear mechanisms rotate (idle) by following a planetary gear mechanism which transmits power among the first planetary gear mechanism PG1, the second planetary gear mechanism PG2, the third planetary gear mechanism PG3 and the fourth planetary gear mechanism PG4.

Figure 4:
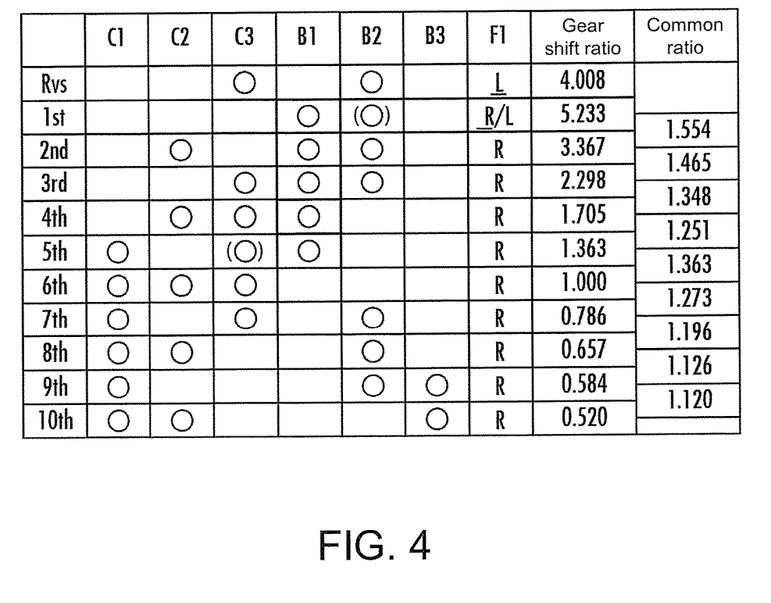
FIG. 4 is an explanatory view illustrating an engagement state of each engagement mechanism in each gear shift stage of the transmission of FIG. 2.

FIG. 4 is a diagram collectively illustrating states of the three clutches of the first clutch C1, the second clutch C2 and the third clutch C3, the three brakes of the first brake B1, the second brake B2 and the third brake B3, and one two-way clutch F1 in each gear shift stage which will be described later.

In this drawing, "O" in a row of each of the first clutch C1, the second clutch C2, the third clutch C3, the first brake B1, the second brake B2 and the third brake B3 indicates a connected state or a fixed state, and a blank indicates an open state. Also, "R" in a row of the two-way clutch F1 indicates a reverse rotation prevention state, and "L" indicates a fixed state.

Further, underlined "R" and "L" indicate that the rotational speed of the third connected body Ca-Cb becomes "0" due to an action of the two-way clutch F1. Also, "R/L" indicates a state that is a reverse rotation prevention state "R" normally but switched to a fixed state "L" when an engine brake is applied.

Further, FIG. 4 indicates a gear shift ratio (rotational speed of the input shaft 32/rotational speed of the output member 33) in each gear shift stage and a common ratio (a ratio of gear ratios between gear shift stages; a value obtained by dividing a gear shift ratio of a predetermined gear shift stage by a gear shift ratio of a gear shift stage that is one gear shift stage higher than the predetermined gear shift stage) in the case in which the gear ratio h of the third planetary gear mechanism PG3 is 2.734, the gear ratio i of the fourth planetary gear mechanism PG4 is 1.614, the gear ratio j of the first planetary gear mechanism PG1 is 2.681, and the gear ratio k of the second planetary gear mechanism PG2 is 1.914. Accordingly, it can be understood that common ratio can be appropriately set.

When a first gear stage is established, the two-way clutch F1 is brought into the reverse rotation prevention state (R in FIG. 4), and the first brake B1 and the second brake B2 are brought into the fixed state.

By setting the two-way clutch F1 to be in the reverse rotation prevention state R and setting the first brake B1 to be in the fixed state, the reverse rotation of the third connected body Ca-Cb and the sun gear Sa (seventh element) of the first planetary gear mechanism PG1 is prevented, and the rotational speed of the third connected body Ca-Cb and the sun gear Sa (seventh element) of the first planetary gear mechanism PG1 becomes "0".

Accordingly, the sun gear Sa (seventh element), the carrier Ca (eighth element), and the ring gear Ra (ninth element) of the first planetary gear mechanism PG1 are brought into a locked state in which relative rotation is not possible, and the rotational speed of the first connected body Cc-Cd-Ra including the ring gear Ra (ninth element) of the first planetary gear mechanism PG1 also becomes "0".

Then, the rotational speed of the ring gear Rb (tenth element) of the second planetary gear mechanism PG2 to which the output member 33 is connected becomes "1st" illustrated in FIG. 3, and the first gear stage is established.

Also, in order to establish the first gear stage, it is not necessary to set the second brake B2 in the fixed state. However, to smoothly shift from the first gear stage to a second gear stage which will be described later, the second brake B2 is fixed in the first gear stage. Further, when the engine brake is applied at the first gear stage, the two-way clutch F1 may be switched from the reverse rotation prevention state R to the fixed state L.

When the second gear stage is established, the two-way clutch F1 is set to be in the reverse rotation prevention state R, the first brake B1 and the second brake B2 are set to be in the fixed state, and the second clutch C2 is set to be in the connected state.

By setting the two-way clutch F1 to be in the reverse rotation prevention state, normal rotation of the third connected body Ca-Cb is allowed. Further, by setting the first brake B1 to be in the fixed state, the rotational speed of the sun gear Sa (seventh element) of the first planetary gear mechanism PG1 becomes "0". Furthermore, by setting the second brake B2 to be in the fixed state, the rotational speed of the sun gear Sd (sixth element) of the fourth planetary gear mechanism PG4 becomes "0".

Also, by setting the second clutch C2 to be in the connected state, the rotational speed of the second connected body Rc-Sb becomes "0" which is the same speed as the rotational speed of the sun gear Sd (sixth element) of the fourth planetary gear mechanism PG4.

Then, the rotational speed of the ring gear Rb (tenth element) of the second planetary gear mechanism PG2 to which the output member 33 is connected becomes "2nd" illustrated in FIG. 3, and the second gear stage is established.

When a third gear stage is established, the two-way clutch F1 is set to be in the reverse rotation prevention state, the first brake B1 and the second brake B2 are set to be in the fixed state, and the third clutch C3 is set to be in the connected state.

By setting the two-way clutch F1 to be in the reverse rotation prevention state, normal rotation of the third connected body Ca-Cb is allowed. Further, by setting the first brake B1 to be in the fixed state, the rotational speed of the sun gear Sa (seventh element) of the first planetary gear mechanism PG1 becomes "0". Furthermore, by setting the second brake B2 to be in the fixed state, the rotational speed of the sun gear Sd (sixth element) of the fourth planetary gear mechanism PG4 becomes "0".

Also, by setting the third clutch C3 to be in the connected state, the rotational speed of the ring gear Rd (fourth element) of the fourth planetary gear mechanism PG4 becomes "1" which is the same speed as the rotational speed of the sun gear Sc (first element) of the third planetary gear mechanism PG3 connected to the input shaft 32.

Accordingly, since the rotational speed of the sun gear Sd (sixth element) of the fourth planetary gear mechanism PG4 becomes "0" and the rotational speed of the ring gear Rd (fourth element) becomes "1", the rotational speed of the carrier Cd (fifth element), that is, the rotational speed of the first connected body Cc1-Cd-Ra becomes $i/(i+1)$.

Additionally, the rotational speed of the ring gear Rb (tenth element) of the second planetary gear mechanism PG2 to which the output member 33 is connected becomes "3rd" illustrated in FIG. 3, and the third gear stage is established.

When a fourth gear stage is established, the two-way clutch F1 is set to be in the reverse rotation prevention state, the first brake B1 is set to be in the fixed state, and the second clutch C2 and the third clutch C3 are set to be in the connected state.

By setting the two-way clutch F1 to be in the reverse rotation prevention state, normal rotation of the third connected body Ca-Cb is allowed. Further, by setting the first brake B1 to be in the fixed state, the rotational speed of the sun gear Sa (seventh element) of the first planetary gear mechanism PG1 becomes "0".

Further, by setting the second clutch C2 to be in the connected state, the sun gear Sd (sixth element) of the fourth planetary gear mechanism PG4 and the second connected body Rc-Sb rotate at the same speed. Therefore, between the third planetary gear mechanism PG3 and the fourth planetary gear mechanism PG4, the carrier Cc (second element) and the carrier Cd (fifth element) are connected, and the ring gear Rc (third element) and the sun gear Sd (sixth element) are connected. Therefore, in the fourth gear stage in which the second clutch C2 is in the connected state, one alignment chart including four elements formed by the third planetary gear mechanism PG3 and the fourth planetary gear mechanism PG4 can be drawn.

Also, by setting the third clutch C3 to be in the connected state, the rotational speed of the ring gear Rd (fourth element) of the fourth planetary gear mechanism PG4 becomes "1" which is the same speed as the rotational speed of the sun gear Sc (first element) of the third planetary gear mechanism PG3, and the rotational speeds of two elements among the four elements formed by the third planetary gear mechanism PG3 and the fourth planetary gear mechanism PG4 become the same speed of "1".

Accordingly, each of the elements of the third planetary gear mechanism PG3 and the fourth planetary gear mechanism PG4 is in the locked state in which relative rotation is not possible, and the rotational speeds of all the elements of the third planetary gear mechanism PG3 and the fourth planetary gear mechanism PG4 become "1". Further, the rotational speed of the third connected body becomes j/(j+1).

Additionally, the rotational speed of the ring gear Rb (tenth element) of the second planetary gear mechanism PG2 to which the output member 33 is connected becomes "4th" illustrated in FIG. 3, and the fourth gear stage is established.

When a fifth gear stage is established, the two-way clutch F1 is set to be in the reverse rotation prevention state, the first brake B1 is set to be in the fixed state, and the first clutch C1 and the third clutch C3 are set to be in the connected state.

By setting the two-way clutch F1 to be in the reverse rotation prevention state, normal rotation of the third connected body Ca-Cb is allowed. Further, by setting the first brake B1 to be in the fixed state, the rotational speed of the sun gear Sa (seventh element) of the first planetary gear mechanism PG1 becomes "0".

Further, by setting the first clutch C1 to be in the connected state, the rotational speed of the third connected body Ca-Cb becomes "1" which is the same speed as the rotational speed of the sun gear Sc (first element) of the third planetary gear mechanism PG3.

Additionally, the rotational speed of the ring gear Rb (tenth element) of the second planetary gear mechanism PG2 to which the output member 33 is connected becomes "5th" illustrated in FIG. 3, and the fifth gear stage is established.

Also, to establish the fifth gear stage, it is not necessary to set the third clutch C3 to be in the connected state. However, in the fourth gear stage and a sixth gear stage which will be described later, it is necessary to set the third clutch C3 in the connected state, and thus the fifth gear stage is also set to be in the connected state such that downshifting from the fifth gear stage to the fourth gear stage and upshifting from the fifth gear stage to the sixth gear stage which will be described later can be performed smoothly.

When the sixth gear stage is established, the two-way clutch F1 is set to be in the reverse rotation prevention state, and the first clutch C1, the second clutch C2 and the third clutch C3 are set to be in the connected state.

By setting the two-way clutch F1 to be in the reverse rotation prevention state, the normal rotation of the third connected body Ca-Cb is allowed.

Further, by setting the second clutch C2 and the third clutch C3 to be in the connected state, each of the elements of the third planetary gear mechanism PG3 and the fourth planetary gear mechanism PG4 is in a state in which relative rotation is not possible, and the rotational speed of the second connected body Rc-Sb becomes "1" as described for the fourth gear stage. Furthermore, by setting the first clutch C1 to be in the connected state, the rotational speed of the third connected body Ca-Cb becomes "1".

As a result, the rotational speeds of the carrier Cb (eleventh element) and the sun gear Sb (twelfth element) of the second planetary gear mechanism PG2 become the same speed of "1", and each of the elements is in the locked state in which relative rotation is not possible.

Additionally, the rotational speed of the ring gear Rb (tenth element) of the second planetary gear mechanism PG2 to which the output member 33 is connected becomes "1" of "6" illustrated in FIG. 3, and the sixth gear stage is established.

When a seventh gear stage is established, the two-way clutch F1 is set to be in the reverse rotation prevention state, the second brake B2 is set to be in the fixed state, and the first clutch C1 and the third clutch C3 are set to be in the connected state.

By setting the two-way clutch F1 to be in the reverse rotation prevention state, normal rotation of the third connected body Ca-Cb is allowed. Further, by setting the second brake B2 to be in the fixed state, the rotational speed of the sun gear Sd (sixth element) of the fourth planetary gear mechanism PG4 becomes "0".

Also, by setting the third clutch C3 to be in the connected state, the rotational speed of the ring gear Rd (fourth element) of the fourth planetary gear mechanism PG4 becomes "1" which is the same speed as the rotational speed of the sun gear Sc (first element) of the third planetary gear mechanism PG3, and the rotational speed of the first connected body Cc1-Cd-Ra including the carrier Cd (fifth element) of the fourth planetary gear mechanism PG4 becomes i/(i+1). Further, by setting the first clutch C1 to be in the connected state, the rotational speed of the third connected body Ca-Cb becomes "1" which is the same speed as the rotational speed of the sun gear Sc (first element) of the third planetary gear mechanism PG3 connected to the input shaft 32.

Additionally, the rotational speed of the ring gear Rb (tenth element) of the second planetary gear mechanism PG2 to which the output member 33 is connected becomes "7th" illustrated in FIG. 3, and the seventh gear stage is established.

When an eighth gear stage is established, the two-way clutch F1 is set to be in the reverse rotation prevention state, the second brake B2 is set to be in the fixed state, and the first clutch C1 and the second clutch C2 are set to be in the connected state.

By setting the two-way clutch F1 to be in the reverse rotation prevention state, normal rotation of the third connected body Ca-Cb is allowed. Further, by setting the second brake B2 to be in the fixed state, the rotational speed of the sun gear Sd (sixth element) of the fourth planetary gear mechanism PG4 becomes "0".

Further, by setting the second clutch C2 to be in the connected state, the rotational speed of the second connected body Rc-Sb becomes "0" which is the same speed as the rotational speed of the sun gear Sd (sixth element) of the fourth planetary gear mechanism PG 4. Also, by setting the first clutch C1 to be in the connected state, the rotational speed of the third connected body Ca-Cb becomes "1" which is the same speed as the rotational speed of the sun gear Sc (first element) of the third planetary gear mechanism PG3.

Additionally, the rotational speed of the ring gear Rb (tenth element) of the second planetary gear mechanism PG2 to which the output member 33 is connected becomes "8th" illustrated in FIG. 3, and the eighth gear stage is established.

When a ninth gear stage is established, the two-way clutch F1 is set to be in the reverse rotation prevention state, the second brake B2 and the third brake B3 are set to be in the fixed state, and the first clutch C1 is set to be in the connected state.

By setting the two-way clutch F1 to be in the reverse rotation prevention state, normal rotation of the third connected body Ca-Cb is allowed. Further, by setting the second brake B2 to be in the fixed state, the rotational speed of the sun gear Sd (sixth element) of the fourth planetary gear mechanism PG4 becomes "0". Also, by setting the third brake B3 to be in the fixed state, the rotational speed of the ring gear Rd (fourth element) of the fourth planetary gear mechanism PG4 also becomes "0".

Accordingly, the sun gear Sd (sixth element), the carrier Cd (fifth element), and the ring gear Rd (fourth element) of the fourth planetary gear mechanism PG4 are in the locked state in which relative rotation is not possible, and the rotational speed of the first connected body Cc-Cd-Ra including the carrier Cd (fifth element) of the fourth planetary gear mechanism PG4 also becomes "0".

Further, by setting the first clutch C1 to be in the connected state, the rotational speed of the third connected body Ca-Cb becomes "1" which is the same speed as the rotational speed of the sun gear Sc (first element) of the third planetary gear mechanism PG3.

Additionally, the rotational speed of the ring gear Rb (tenth element) of the second planetary gear mechanism PG2 to which the output member 33 is connected becomes "9th" illustrated in FIG. 3, and the ninth gear stage is established.

When a tenth gear stage is established, the two-way clutch F1 is set to be in the reverse rotation prevention state R, the third brake B3 is set to be in the fixed state, and the first clutch C1 and the second clutch C2 are set to be in the connected state.

By setting the two-way clutch F1 to be in the reverse rotation prevention state, normal rotation of the third connected body Ca-Cb is allowed. Also, by setting the third brake B3 to be in the fixed state, the rotational speed of the ring gear Rd (fourth element) of the fourth planetary gear mechanism PG4 becomes "0".

Further, by setting the second clutch C2 to be in the connected state, the second connected body Rc-Sb and the sun gear Sd (sixth element) of the fourth planetary gear mechanism PG4 rotate at the same speed. Also, by setting the first clutch C1 to be in the connected state, the rotational speed of the third connected body Ca-Cb becomes "1" which is the same speed as the rotational speed of the sun gear Sc (first element) of the third planetary gear mechanism PG3.

Additionally, the rotational speed of the ring gear Rb (tenth element) of the second planetary gear mechanism PG2 to which the output member 33 is connected becomes "10th" illustrated in FIG. 3, and the tenth gear stage is established.

When a reverse gear stage is established, the two-way clutch F1 is set to be in the fixed state (L in FIG. 4), the second brake B2 is set to be in the fixed state, and the third clutch C3 is set to be in the connected state.

By setting the second brake B2 to be in the fixed state and setting the third clutch C3 to be connected state, the rotational speed of the first connected body Cc-Cd-Ra becomes $i/(i+1)$. Further, by setting the two-way clutch F1 to be in the fixed state, the rotational speed of the third connected body Ca-Cb becomes "0".

Additionally, the rotational speed of the ring gear Rb (tenth element) of the second planetary gear mechanism PG2 to which the output member 33 is connected becomes "Rvs" of the reverse rotation illustrated in FIG. 3, and the reverse gear stage is established.

Figure 5:
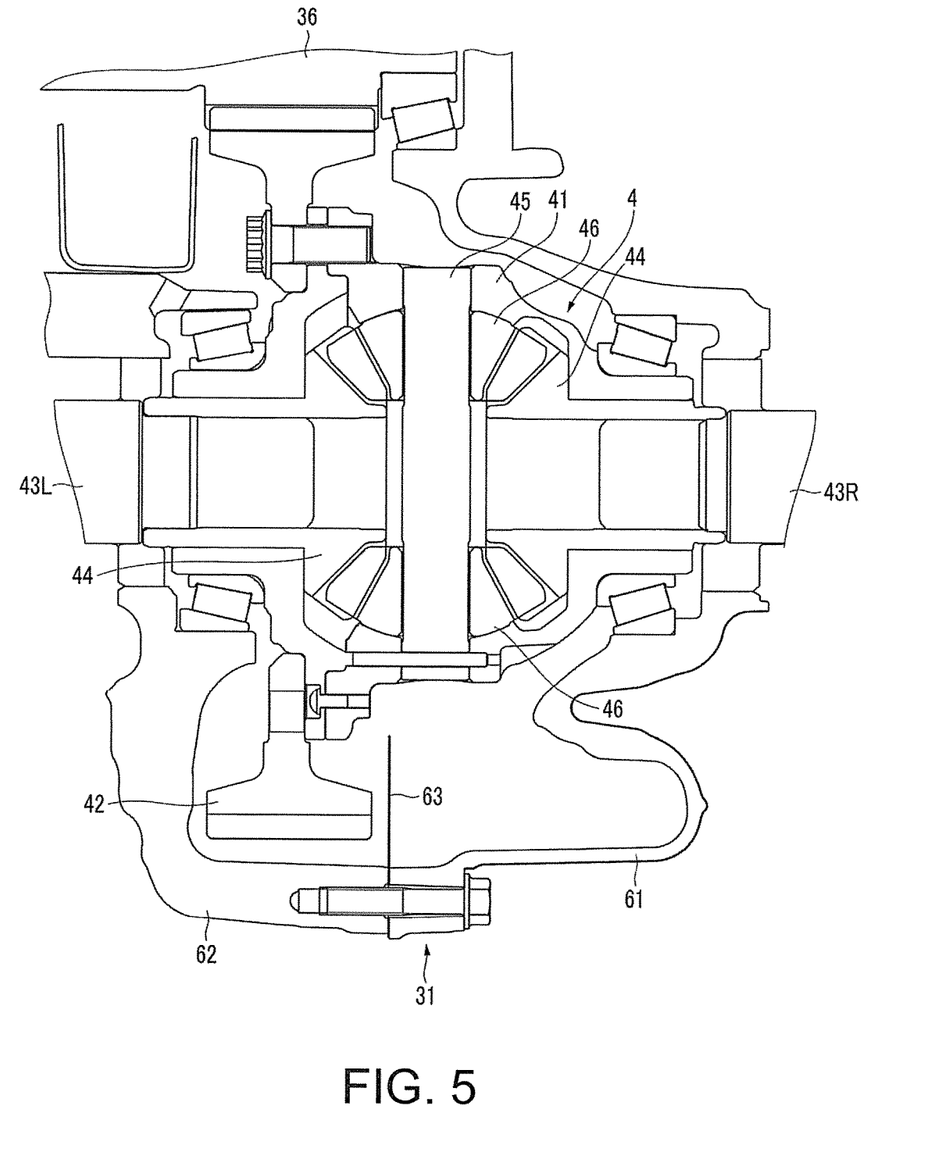
FIG. 5 is a front view illustrating a main portion of a transmission case of the power transmission device of FIG. 1 in section.

Returning to FIG. 2, the front differential gear 4 includes a differential case 41 rotatably supported by the transmission case 31 of the transmission 3 (refer to FIG. 5). The final driven gear 42 which is engaged with the final drive gear 36 provided on the idle shaft 35 is fixed to an outer circumference of the differential case 41.

The rotation of the idle shaft 35 of the transmission 3 is transmitted to the differential case 41 via the final drive gear 36 and the final driven gear 42. The rotation of the differential case 41 is transmitted to the front left axle 7L and the front right axle 7R according to loads on the left front wheel WFL and the right rear wheel WRR.

A front left output shaft 43L connected to the front left axle 7L and a front right output shaft 43R connected to the front right axle 7R are engaged with the differential case 41 to be relatively rotatable. A differential side gear 44 is spline-coupled to each of facing ends of the front left output shaft 43L and the front right output shaft 43R.

A pinion shaft 45 is fixed inside the differential case 41 to be orthogonal to the front left output shaft 43L and the front right output shaft 43R. A pair of pinion gears 46 engaged with the two differential side gears 44 are rotatably supported by the pinion shaft 45.

The transfer device 5 includes a transfer input shaft 51 to which a driving force is transmitted from the final driven gear 42 of the front differential gear 4, and a transfer output shaft 52 to which the driving force is transmitted from the transfer input shaft 51 and which transmits the driving force to a propeller shaft 8.

A transfer input gear 53 engaged with the final driven gear 42 is spline coupled to and pivotally supported by an end of the transfer input shaft 51 on the front differential gear 4 side. A first bevel gear 54 which is a helical gear is provided at an opposite end of the transfer input shaft 51.

A second bevel gear 55 which is a helical gear is provided at an end (front end) of the transfer output shaft 52 on the transfer input shaft 51 side. On the other hand, an end of the propeller shaft 8 is coupled to a rear end of the transfer output shaft 52.

As the first bevel gear 54 and the second bevel gear 55 are engaged with each other, rotation of the transfer input shaft 51 is transmitted to the propeller shaft 8 (refer to FIG. 1) via the transfer output shaft 52.

Next, an assembling process of the transmission case 31 (casing) will be described with reference to FIGS. 5 to 7.

As illustrated in FIG. 5, the transmission case 31 is formed by joining the TC side case member 61 (second case member) which accommodates the torque converter 2 and a TM side case member 62 (first case member) which accommodates the transmission 3 to each other at opening edges thereof. Further, a gasket 63 is interposed between an opening end edge of the TC side case member 61 and an opening end edge of the TM side case member 62 to prevent the lubricating oil therein from leaking.

Figure 6:
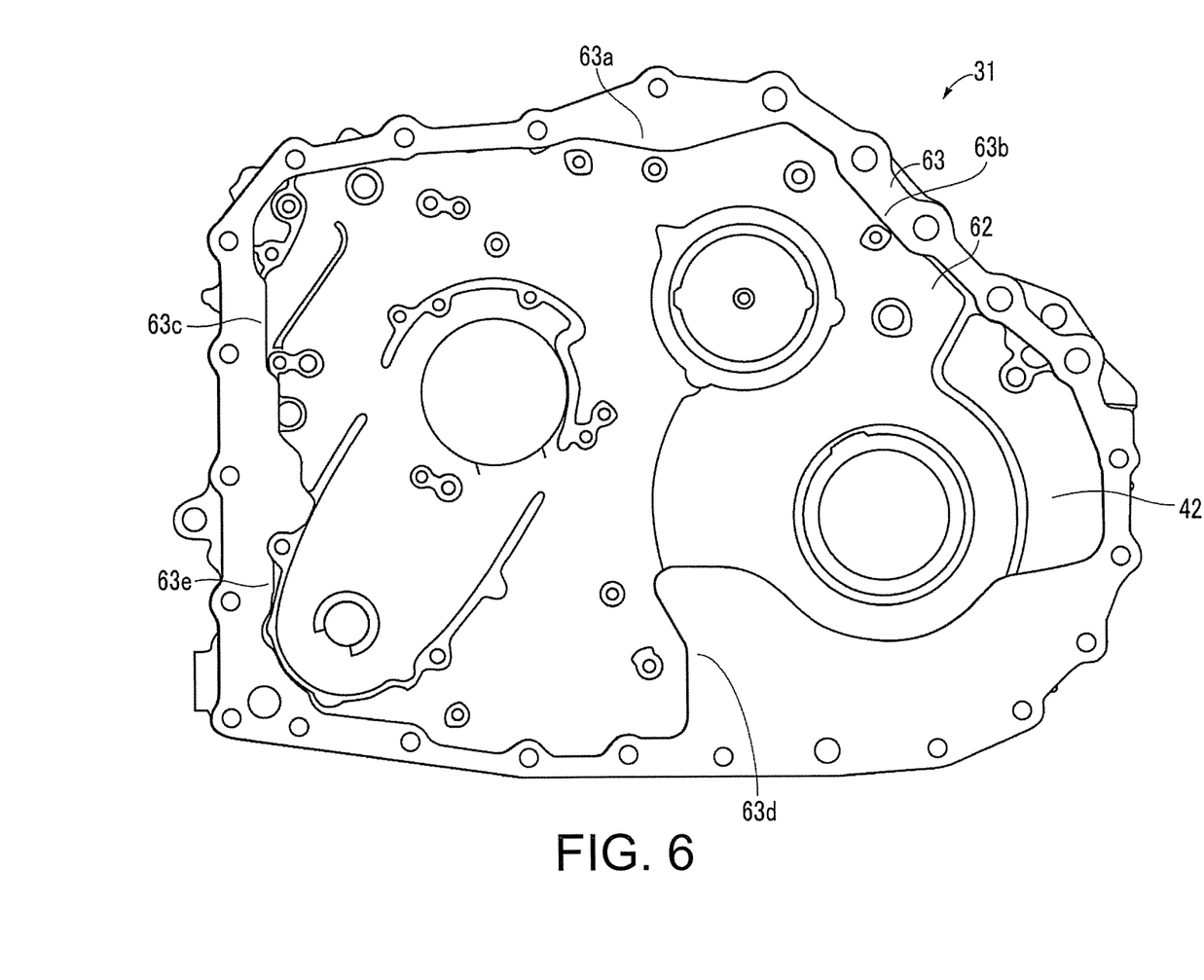
FIG. 6 is a side view illustrating a TM side case member of the transmission case of FIG. 5, and built-in components and gaskets fixed thereto.

As illustrated in FIG. 6, first, in the assembling process of the transmission case 31, the gasket 63 is placed on the TM side case member 62 before the TC side case member 61 and the TM side case member 62 are joined to each other.

The gasket 63 has a plurality of held portions which protrude toward an inside of the TM side case member 62 (that is, the transmission case 31). Specifically, the gasket 63 has a first held portion 63a and a second held portion 63b protruding downward from a position which is on an upper side when installed on the vehicle body, a third held portion 63c protruding inward from a portion above a position which is on a lateral side, a fourth held portion 63d protruding upward from a position which is on a lower side, and a fifth held portion 63e protruding laterally from a portion below the position which is on the lateral side.

Figure 7:
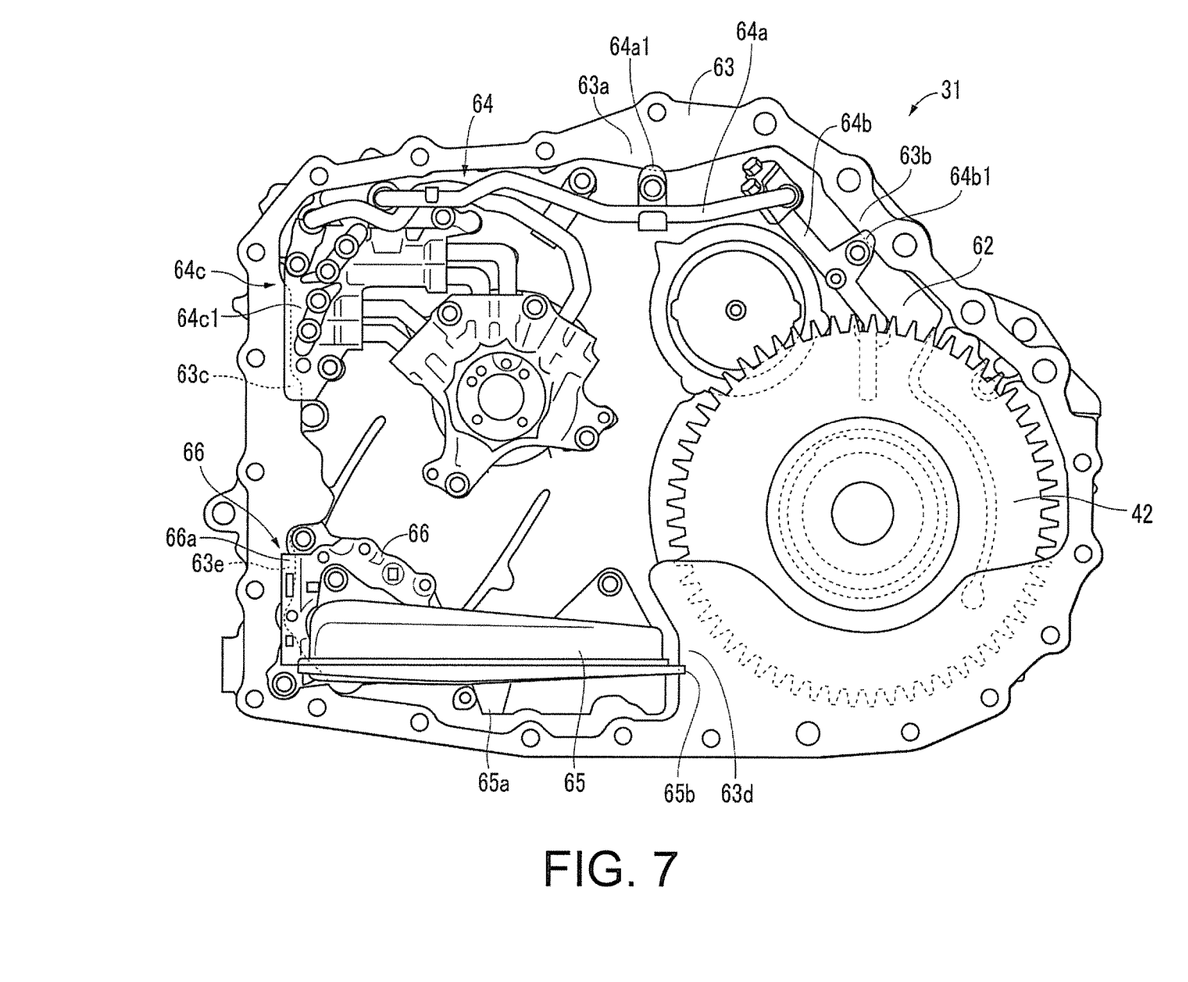
FIG. 7 is a side view illustrating the TM side case member of the transmission case of FIG. 5 and a built-in component and a gasket held thereby.

As illustrated in FIG. 7, in the assembling process of the transmission case 31, after the gasket 63 is placed on the TM side case member 62, a discharge mechanism 64, a strainer 65 and a pump 66 which are built-in components are fixed to the TM side case member 62.

The discharge mechanism 64 is fixed at a side above a space inside the TM side case member 62. The discharge mechanism 64 is a mechanism in which at least some of hydraulic oil used in a hydraulic operating mechanism such as the torque converter 2, the input shaft 32, and the first clutch C1 is discharged (supplied) as the lubricating oil (lubricating fluid) into the transmission case 31.

The discharge mechanism 64 supplies the discharged lubricating oil to other components disposed inside the transmission case 31 via a supply pipe including a first pipe member 64a and a second pipe member 64b. The supply pipe extends from a main body portion 64c fixed to a position corresponding to the hydraulic operating mechanism toward each component.

A claw-shaped first holding portion 64a1 is provided at a position on the first pipe member 64a corresponding to the first held portion 63a of the gasket 63. Also, a second holding portion 64b1 is provided at a position of the second pipe member 64b corresponding to the second held portion 63b. The first holding portion 64a1 and the second holding portion 64b1 are in contact with the first held portion 63a and the second held portion 63b of the gasket 63 from the TC side case member 61 side.

A third holding portion 64c1 extends from a position of the main body portion 64c corresponding to the third held portion 63c of the gasket 63. The third holding portion 64c1 is in contact with the third held portion 63c of the gasket 63 from the TC side case member 61 side.

The strainer 65 and the pump 66 are disposed at a position which is located at a side below a space inside the TM side case member 62, is on the TC side case member 61 side of the gasket 63 (that is, an end surface of the TM side case member 62) and is also away from the final driven gear 42 in a direction intersecting the rotational central axial line of the final driven gear 42 (that is, a position which is on a front side in a traveling direction of the vehicle V).

The strainer 65 has a suction portion 65a for suctioning the lubricating oil from the oil reservoir at a center of a lower surface thereof. The pump 66 suctions the lubricating oil from the oil reservoir below the transmission case 31 via the suction portion 65a of the strainer 65 and then supplies the lubricating oil to the hydraulic operating mechanism (for example, the torque converter 2, the input shaft 32, the first clutch C1, and so on).

A protrusion-shaped fourth holding portion 65b is provided at a position of the strainer 65 corresponding to the fourth held portion 63d of the gasket 63. The fourth holding portion 65b is in contact with the fourth held portion 63d of the gasket 63 from the TC side case member 61 side.

A fifth holding portion 66a extends from a position of the pump 66 corresponding to the fifth held portion 63e of the gasket 63. The fifth holding portion 66a is in contact with the fifth held portion 63e of the gasket 63 from the TC side case member 61 side.

When these built-in components (the discharge mechanism 64, the strainer 65 and the pump 66) are fixed to the TM side case member 62, the first held portion 63a, the second held portion 63b, the third held portion 63c, the fourth held portion 63d and the fifth held portion 63e of the gasket 63 are sandwiched between the TM side case member 62 and each of the first holding portion 64a1, the second holding portion 64b1, the third holding portion 64c1, the fourth holding portion 65b and the fifth holding portion 66a which are provided in the built-in components toward the held portions. Therefore, the gasket 63 is held by the TM side case member 62.

Additionally, in the assembling process of the transmission case 31, after the built-in components are held, the TC side case member 61 is moved to cover the TM side case member 62. At this time, since the gasket 63 is held with respect to the TM side case member 62, it does not deviate from the opening edge of the TM side case member 62.

Then, in the assembling process of the transmission case 31, the TM side case member 62 and the TC side case member 61 are fixed by bolts, and thus the assembling of the transmission case 31 is completed.

As described above, in the transmission case 31, the gasket 63 is held by the TM side case member 62 using a part of the built-in components (the discharge mechanism 64, the strainer 65 and the pump 66) originally accommodated and fixed inside the TM side case member 62 and a part of the gasket 63.

Accordingly, when the built-in components are fixed to the TM side case member 62, the gasket 63 is also held together. Therefore, it is possible to omit a process and a mechanism only for holding the gasket 63.

Therefore, according to the transmission case 31, it is possible to hold the gasket 63 without performing a complicated process while minimizing an increase in size of the entire power transmission device PT.

Although the illustrated embodiment has been described above, the present disclosure is not limited to such an embodiment.

For example, in the above-described embodiment, the transmission case 31 includes the TC side case member 61 and the TM side case member 62 which are joined to each other through opening edges thereof.

However, the casing of the present disclosure is not limited to such a configuration, and it may be formed by joining a plurality of case members to each other through opening edges thereof. For example, three or more case members may be joined to each other through opening edges thereof.

Further, in the casing of the power transmission device of the disclosure, the first case member may be a case member (for example, the TM side case member 62 in the embodiment, the same below) of the plurality of case members configured to accommodate a transmission or a case member (for example, the TC side case member 61 in the embodiment, the same below) configured to accommodate a torque converter, and the built-in components may include at least one of a strainer, a pump, and a lubricating fluid supply pipe.

The strainer, the pump, and the lubricating fluid supply pipe are originally fixed to the case member which accommodates the transmission or the torque converter, and the holding portion such as a claw can be easily provided. Therefore, when these members are used as built-in components for fixing the gasket, it is possible to easily form the holding portion provided in the built-in component.

Further, in the above-described embodiment, the discharge mechanism 64, the strainer 65 and the pump 66 are used as built-in components used for holding the gasket 63. This is to facilitate formation of the holding portion using the built-in components originally fixed to the TM side case member 62 which holds the gasket 63.

However, the built-in components of the present disclosure are not limited thereto. For example, only one of the discharge mechanism, the strainer and the pump may be used, or other built-in components may be used.

Furthermore, in the above-described embodiment, the TM side case member which accommodates the transmission is a first case which holds the gasket by fixing the built-in components. However, the present disclosure is not limited to such a configuration, and the TC side case member which accommodates the torque converter may be the first case member. In this case, the holding portion may be formed in a built-in component fixed to a case member which accommodates the torque converter and may hold the gasket.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A casing of a power transmission device which is formed by joining a plurality of case members including a first case member and a second case member to each other through opening edges thereof, the casing comprising:
   a gasket interposed between the first case member and the second case member,
   wherein a built-in component is accommodated within the casing and fixed to the first case member,
   a held portion extends from the gasket toward the built-in component,
   a holding portion is formed from the built-in component and extended toward the held portion, and
   the holding portion is configured to be in contact with the held portion, such that the gasket is held by the first case member by sandwiching the held portion between the first case member and the holding portion, wherein
   the first case member is a case member of the plurality of case members configured to accommodate a transmission, and
   the built-in components include at least one of a strainer, a pump, and a lubricating fluid supply pipe.

2. A casing of a power transmission device which is formed by joining a plurality of case members including a first case member and a second case member to each other through opening edges thereof, the casing comprising:
   a gasket interposed between the first case member and the second case member,
   wherein a built-in component is accommodated within the casing and fixed to the first case member,
   a held portion extends from the gasket toward the built-in component,
   a holding portion is formed from the built-in component and extended toward the held portion, and
   the holding portion is configured to be in contact with the held portion, such that the gasket is held by the first case member by sandwiching the held portion between the first case member and the holding portion, wherein
   the first case member is a case member of the plurality of case members configured to accommodate a torque converter, and
   the built-in components include at least one of a strainer, a pump, and a lubricating fluid supply pipe.

* * * * *